(12) United States Patent
Krut et al.

(10) Patent No.: US 10,414,041 B2
(45) Date of Patent: Sep. 17, 2019

(54) PLATFORM FOR A PARALLEL ROBOT FOR ACTING ON AN OBJECT

(71) Applicants: UNIVERSITÉ DE MONTPELLIER, Montpellier (FR); CENTRE NATIONAL DE LA RECHERCHE SCIENTIFIQUE, Paris (FR)

(72) Inventors: Sébastien Krut, Montpellier (FR); Olivier Company, Cournonsec (FR); Francois Pierrot, Saint Jean de Vedas (FR)

(73) Assignees: UNIVERSITÉ DE MONTPELLIER, Montpellier (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 248 days.

(21) Appl. No.: 15/312,248

(22) PCT Filed: May 19, 2015

(86) PCT No.: PCT/EP2015/061003
§ 371 (c)(1),
(2) Date: Nov. 18, 2016

(87) PCT Pub. No.: WO2015/177154
PCT Pub. Date: Nov. 26, 2015

(65) Prior Publication Data
US 2017/0080560 A1    Mar. 23, 2017

(30) Foreign Application Priority Data
May 19, 2014  (FR) .................. 14 54457

(51) Int. Cl.
*B25J 9/00* (2006.01)
*B25J 17/02* (2006.01)

(52) U.S. Cl.
CPC .......... *B25J 9/0051* (2013.01); *B25J 9/0015* (2013.01); *B25J 17/0216* (2013.01)

(58) Field of Classification Search
CPC ...... B25J 9/0015; B25J 9/0051; B25J 9/0009; B25J 9/10; B25J 9/1015; B25J 9/1065; B25J 9/003; B25J 17/0216
(Continued)

(56) References Cited

U.S. PATENT DOCUMENTS 5,656,905 A * 8/1997 Tsai ..................... B23Q 1/5462
                                                 318/560
6,047,610 A * 4/2000 Stocco ................. B25J 17/0266
                                                 74/479.01
(Continued)

FOREIGN PATENT DOCUMENTS

CN    102229141 A    11/2011
CN    102975197 A    3/2013
(Continued)

OTHER PUBLICATIONS

English Translation of the International Search Report for PCT/EP2015/061003 dated Jul. 22, 2015.
(Continued)

*Primary Examiner* — William Kelleher
*Assistant Examiner* — T. Scott Fix
(74) *Attorney, Agent, or Firm* — Thompson Coburn LLP; Bradley H. Thomas (57) ABSTRACT

A platform for a parallel robot, for acting on an object, including:
  at least two frames comprising at least two pairs of swivels;
  at least two bridges that are connected to each of the frames respectively by four hinges which are substantially parallel to an axial direction (V); and
(Continued)

a base to be connected to an effector, which is suitable for acting on the object.

The base is connected to each bridge respectively by at least one hinge which is oriented along a connection axis which is substantially parallel to the axial direction.

11 Claims, 4 Drawing Sheets

(58) Field of Classification Search
USPC ............ 74/479.01, 490.01; 901/27; 483/901, 483/902
See application file for complete search history.

(56) References Cited

U.S. PATENT DOCUMENTS

| | | | | |
|---|---|---|---|---|
| 6,516,681 | B1* | 2/2003 | Pierrot | B25J 17/0266 74/490.01 |
| 6,974,297 | B2* | 12/2005 | Brogardh | B23Q 1/5462 414/680 |
| 6,997,669 | B2* | 2/2006 | Kong | B25J 17/0266 414/735 |
| 7,990,628 | B1* | 8/2011 | Calvet | G02B 7/023 359/811 |
| 8,931,359 | B2* | 1/2015 | Quaid | F16H 21/44 74/490.03 |
| 9,086,101 | B2* | 7/2015 | Zhu | F16F 1/027 |
| 2003/0056364 | A1 | 3/2003 | Morita et al. | |
| 2005/0262959 | A1* | 12/2005 | Angeles | B23Q 1/52 74/490.01 |
| 2009/0019960 | A1* | 1/2009 | Nabat | B25J 17/0266 74/490.03 |
| 2009/0269180 | A1* | 10/2009 | Wappling | B25J 15/04 414/729 |
| 2010/0263470 | A1* | 10/2010 | Bannasch | B25J 9/104 74/490.05 |
| 2010/0275717 | A1* | 11/2010 | Poyet | B82Y 35/00 74/479.01 |
| 2012/0079908 | A1* | 4/2012 | Long | B25J 9/0051 74/490.05 |
| 2012/0215355 | A1* | 8/2012 | Bewley | B25J 5/005 700/258 |
| 2012/0227532 | A1 | 9/2012 | Huang et al. | |
| 2013/0142608 | A1* | 6/2013 | Zhang | B25J 9/0051 414/729 |
| 2013/0306384 | A1* | 11/2013 | Baradat | B25J 9/0045 180/8.6 |
| 2014/0096629 | A1* | 4/2014 | Liu et al. | B41J 25/3086 73/866.5 |

FOREIGN PATENT DOCUMENTS

| | | |
|---|---|---|
| EP | 1084802 A2 | 3/2001 |
| EP | 1870214 A1 | 12/2007 |
| JP | H08-052683 A | 2/1996 |
| JP | 2001-88072 A | 4/2001 |
| JP | 2003-62773 A | 3/2003 |
| JP | 2008-529816 A | 8/2008 |

OTHER PUBLICATIONS

Search Report for FR Application 1454457 dated Jan. 26, 2015.
Written Opinion for PCT/EP2015/061003 dated Jul. 22, 2015.
Office Action for JP Application 2016-568528 dated Mar. 12, 2019.

* cited by examiner

PLATFORM FOR A PARALLEL ROBOT FOR ACTING ON AN OBJECT

CROSS-REFERENCE TO RELATED APPLICATIONS

This application is a U.S. National Phase application of PCT/EP2015/061003, filed on May 19, 2015, claiming the benefit of FR Application No. 14 54457, filed May 19, 2014, both of which are incorporated herein by reference in their entireties.

BACKGROUND OF THE INVENTION

The present invention is situated in the field of industrial robotics.

BRIEF SUMMARY OF THE INVENTION

The invention more particularly relates to a platform for a parallel robot for acting on an object, the platform comprising:
- at least two frames, each frame including at least two pairs of swivels,
- at least two bridges that are respectively connected to each of the frames by four hinges oriented along four hinge axes that are substantially parallel to an axial direction, the four hinge axes defining a parallelogram in a plane perpendicular to the axial direction, the parallelogram being movable between a plurality of configurations in which the two sides corresponding to the two frames are substantially parallel to an orientation direction (DI) that is substantially perpendicular to the axial direction, and
- a base mounted on the platform and intended to be connected to an effector that is suitable for controlling the object.

The invention also relates to a parallel robot for acting on a parallel object suitable for acting on an object, characterized in that it comprises:
- a support,
- at least four articulated arms mounted rotating on the support,
- at least one platform as defined above, each of the articulated arms being respectively mounted on one of the pairs of swivels of the platform, and
- an effector connected to the base and that is suitable for acting on the object.

The invention lastly relates to a method implementing such a robot.

The axial direction is generally substantially vertical.

Such robots are intended to handle objects (called pick-and-place operations) at a fast pace, for example four roundtrips per second. These robots are in particular used in the agri-food, pharmaceutical, cosmetic, electronics, etc. industries. Their so-called "parallel" architecture gives them remarkable dynamic performance. Indeed, the implementation of actuating arms directly on the platform, and the presence of particularly light moving parts, allow high dynamics.

The robot known under the name "Quattro" comprises an articulated platform and four actuating arms. This robot has four degrees of freedom: three spatial translations, and a rotation around the vertical to change the orientation of the handled object. The platform assumes the form of a parallelogram deformable in a substantially horizontal plane. The rotation of the object is controlled by the deformation of the platform.

However, for certain applications, such as handling cylindrical objects, or depositing objects in any position, it is not crucial to control the orientation of the object. It then becomes interesting to physically constrain the rotation of the object to zero, i.e., to maintain a predefined orientation of the object around the axial direction.

A first solution consists, owing to the control of the four articulated arms, of imposing a given orientation on the base, and therefore on the effector and the object. However, when the effector and the object are not perfectly centered relative to the platform, the accelerations imparted to the object are reflected by a torque exerted on the base around the axial direction. Such a torque is transmitted to the actuators of the robot, which decreases the possibilities of imparting translational movements, and therefore of achieving high dynamic performance levels, accordingly.

Another solution consists of using a platform in the shape of an equilateral triangle, like that of the robot known under the name "Delta", and suitable for being actuated by three articulated arms. It will be understood that such a platform is not suitable for pre-existing installations with four articulated arms.

Still another solution consists of replacing the articulated platform of the so-called "Quattro" robot with a rigid platform, i.e., not deformable in its plane. Such a rigid platform makes it possible to procure the three degrees of translational freedom and to constrain the rotational movement of the effector, but has the drawback of over-constraining the four actuators. Indeed, since three actuators are sufficient to produce the three translational movements, the fourth actuator must be perfectly synchronized with the other actuators, failing which deformation or even dislocation of the robot may occur. Such perfect synchronization is difficult to achieve, since it requires mastery of the actuating forces and thus a significant computing power to control the robot.

One aim of the invention is therefore to provide a platform suitable for a parallel robot with four articulated arms and making it possible to constrain the rotation of the object around the axial direction, while making it possible to achieve high dynamic performance levels, and that does not require an excessive computing power.

To that end, the invention relates to a platform of the type described above, in which the base is connected to each bridge respectively by at least one hinge oriented along a connection axis substantially parallel to the axial direction, the two connection axes of the base defining, in said plane, a segment parallel to the orientation direction in all configurations of the parallelogram.

According to particular embodiments, the platform comprises one or more of the following features, considered alone or according to any technically possible combinations:
- the connection axes of the base are respectively situated substantially at the middle of the sides of the parallelogram corresponding to the bridges;
- each segment of the parallelogram corresponding to one of the frames has a length L1 and each segment of the parallelogram corresponding to one of the bridges has a length L2, the ratio L1/L2 being greater than or equal to 2.0; and
- the frames and the bridges of the platform are integral, the hinges of the platform being made by local thinning of the platform.

The invention also relates to a parallel robot for acting on an object, the robot comprising:
a support,
at least four articulated arms mounted rotating on the support,
at least one platform as defined above, each of the articulated arms being respectively mounted on one of the pairs of swivels of the platform, and
an effector connected to the base and that is suitable for controlling the object. According to particular embodiments, the robot comprises one or more of the following features, considered alone or according to any technically possible combinations:
the articulated arms are suitable for imparting a translational movement to the platform relative to the support, and for deforming the parallelogram between the configurations of said plurality, the orientation direction remaining fixed relative to the support during the translational movement and in all configurations of said plurality;
the axial direction is substantially vertical; and
each articulated arm comprises a proximal part mounted rotating on the support, and a distal part connected to the proximal part by two swivels, and connected to the platform by one of the pairs of swivels.

The invention lastly relates to a method implementing a robot as defined above, comprising the step consisting of acting on the object using the effector.

According to one particular embodiment, the method comprises the following steps:
imparting a translational movement to the platform relative to the support using the articulated arms, the orientation direction remaining fixed relative to the support, and
deforming the parallelogram using the articulated arms from any of the configurations of said plurality to any other of the configurations of said plurality, the orientation direction remaining fixed relative to the support.

BRIEF DESCRIPTION OF THE DRAWINGS

The invention will be better understood upon reading the following description, provided solely as an example and done in reference to the appended drawings, in which.

DETAILED DESCRIPTION OF THE INVENTION

Figure 1:
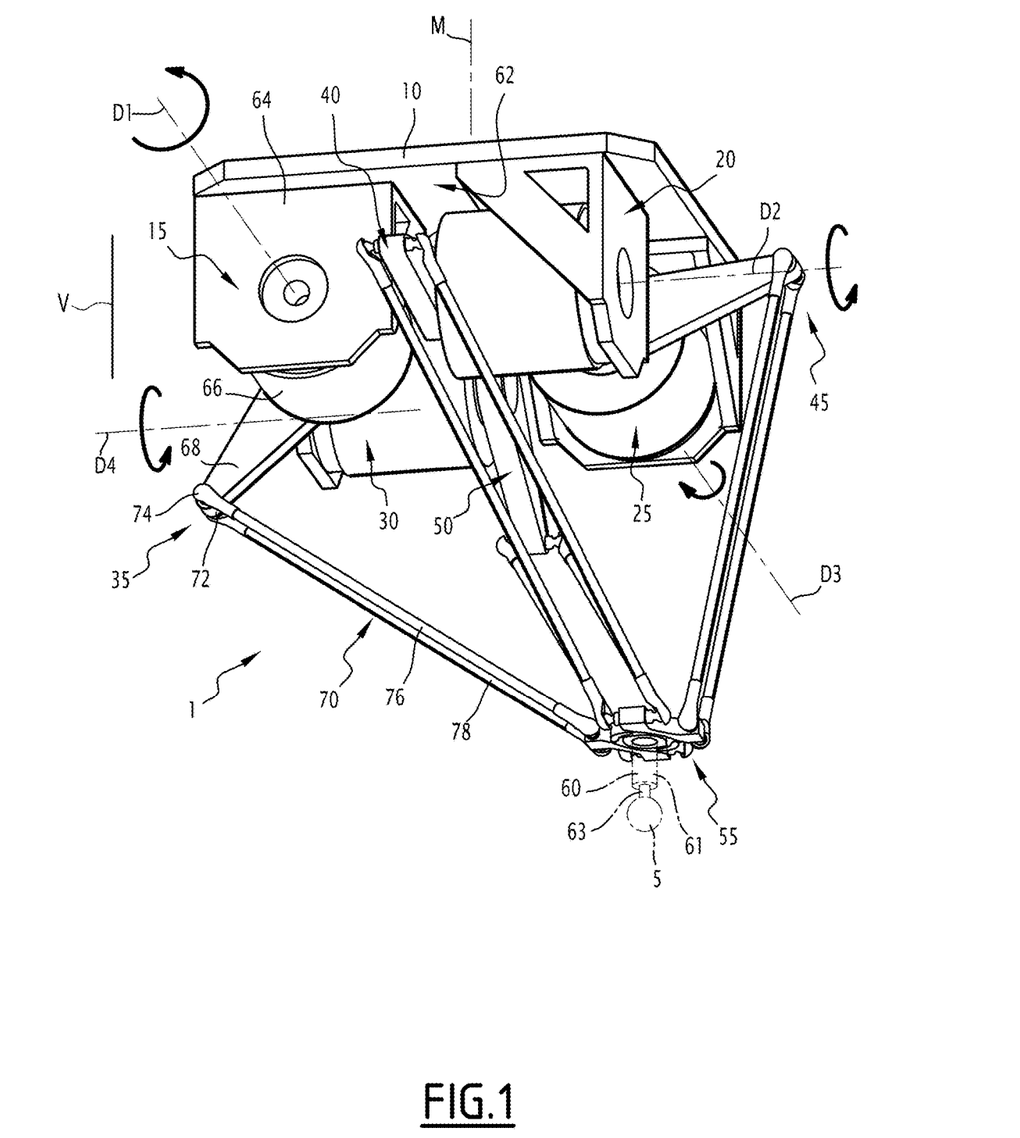
FIG. 1 is a diagrammatic perspective view of a robot according to the invention.

In reference to FIG. 1, a robot 1 according to the invention is described.

The robot 1 is for example part of the production chain (not shown) in the agri-food, pharmaceutical, cosmetic, electronics, etc. industries. The robot 1 is suitable for moving an object 5 (visible in the bottom of FIG. 1) that is for example a foodstuff or a box of medicine.

An axial direction V is defined that is, in the example illustrated in the figures, substantially vertical. An orientation direction DI (FIG. 2) is also defined that is substantially perpendicular to the axial direction V and that reflects a spatial orientation of the object 5. Lastly, a transverse direction T is defined that is substantially perpendicular to the axial direction V and the orientation direction DI. The orientation direction DI and the transverse direction T define a plane P that is substantially horizontal in the illustrated example.

The robot 1 is said to be "parallel". The robot 1 is suitable for translating the object 5 along the three spatial directions, for example the axial direction V, the transverse direction T and the orientation direction DI, advantageously using fast movements, for example around several roundtrips per second.

The robot 1 comprises a support 10, four actuators 15, 20, 25, 30 fastened on the support, four articulated arms 35, 40, 45, 50 respectively mounted on the actuators, a platform 55 supported by the four articulated arms, and an effector 60 fastened on the platform and suitable for acting on the object 5.

According to one alternative (not shown), the effector 60 comprises at least one motor able to rotate the object 5 around an axis parallel to the axial direction.

"Act on" for example means that the effector 60 is suitable for grasping the object 5, carrying it during a translational movement of the platform 55 relative to the support 10, and releasing the object 5.

The support 10 has a substantially planar shape and is substantially parallel to the plane P. The support 10 for example has a substantially square general shape seen along the axial direction V. The support 10 is intended to be fastened using any appropriate means on a support structure (not shown), such as a ceiling.

According to alternatives that are not shown, the support 10 has a substantially rectangular general shape, or nonplanar.

The actuators 15, 20, 25, 30 or fastened below the support 10, advantageously substantially at the four corners defined by a lower face of 62 of the support. The actuators 15, 20, 25, 30 being substantially structurally similar to one another, only the actuator 15 will be described in detail below.

The actuator 15 comprises a frame 64 fastened on the support 10, and a stator 66 secured to the frame 64. The actuator 15 is able to impart a rotational movement to the articulated arm 35 relative to the support 10 around an axis D1 substantially parallel to the plane P.

The axis D1 for example forms an angle of about 45° with the orientation direction DI projected on the plane P.

In the illustrated example, the actuators 20, 25, 30 are deduced from the actuator 15 by successive 90° rotations around a median axis M of the robot 1 (FIGS. 1 and 2), the median axis M being substantially parallel to the axial direction V.

Thus, the actuator 20 is able to impart a rotational movement to the articulated arm 40 relative to the support 10 around an axis D2 substantially parallel to the plane P and substantially perpendicular to the axis D1.

Likewise, the actuator 25 is able to impart a rotational movement to the articulated arm 45 relative to the support 10 around an axis D3 substantially parallel to the plane P and substantially perpendicular to the axis D2.

Lastly, the actuator 30 is able to rotate the articulated arm 50 relative to the support 10 around an axis D4 substantially parallel to the plane P and substantially perpendicular to the axis D1.

Each of the actuators 15, 20, 25, 30 is equipped with at least one motor suitable for controlling the rotation of the articulated arms 35, 40, 45, 50 relative to the frames 64 around the axes D1, D2, D3, D4, respectively.

The articulated arms 35, 40, 45, 50 being substantially structurally similar to one another, only the articulated arm 35 will be described in detail below.

The articulated arm 35 includes a proximal part 68 forming an upper arm, and a distal part 70 articulated on the proximal part and forming a forearm.

The proximal part 68 is mounted rotating relative to the stator 66 around the axis D1. The proximal part 68 has an elongated general shape, for example substantially perpendicular to the axis D1.

The proximal part 68 includes two spheres 72, 74 at its distal end that are fastened on two opposite faces of the proximal part 68 along the axis D1.

In the illustrated example, the distal part 70 is made up of two uprights 76, 78 arranged substantially parallel to one another on the spheres 72, 74.

Each upright 76, 78 includes a cup-shaped proximal end respectively complementary to the spheres 72, 74, the whole forming a swivel. Each upright 76, 78 further includes a distal end, also cup-shaped and suitable for cooperating with the platform 55.

As shown in FIG. 1, the platform 55 is situated at the end of the articulated arms 35, 40, 45, 50.

Figure 2:
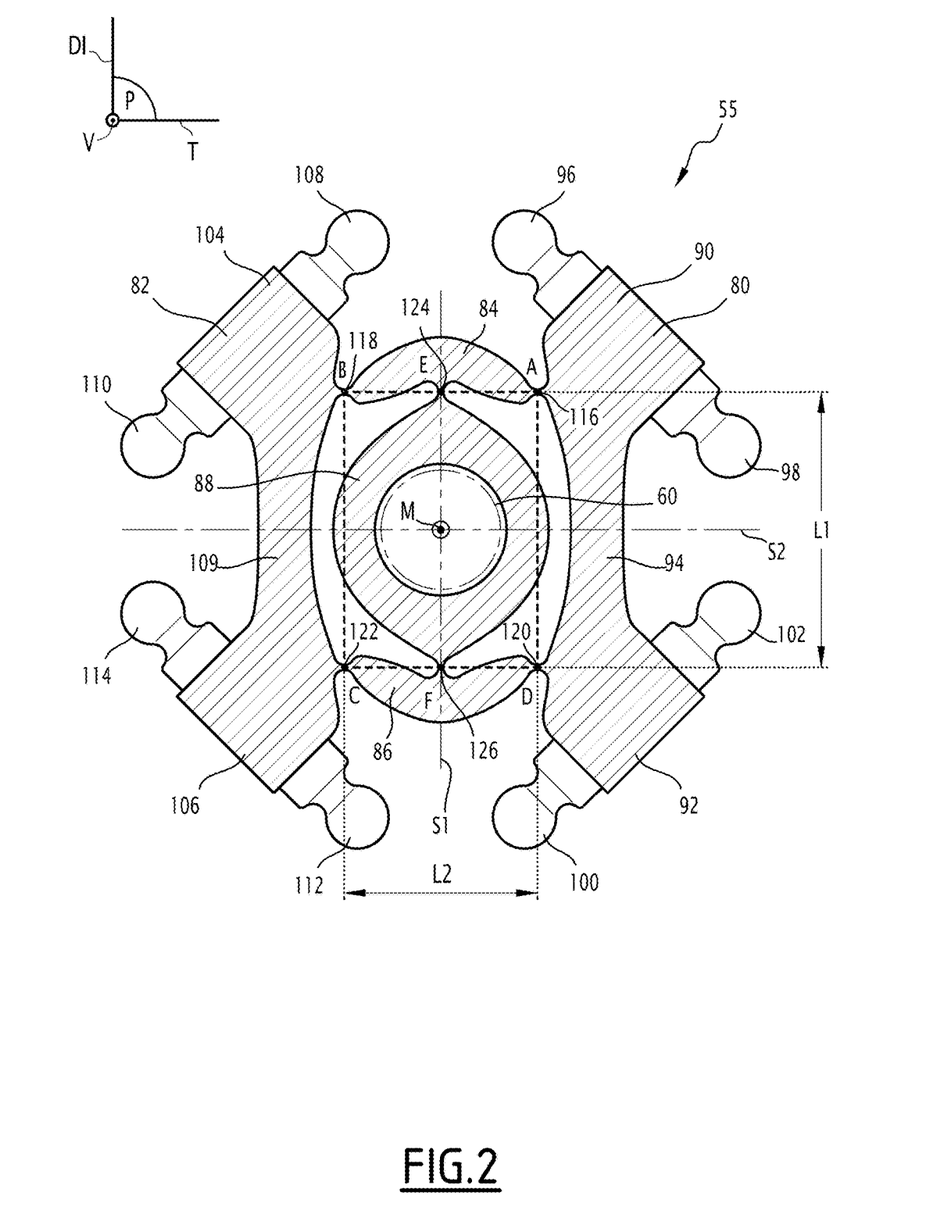
FIG. 2 is a diagrammatic top view of the platform of the robot shown in FIG. 1, the platform being in an intermediate configuration in which the parallelogram is a rectangle.

As shown in FIG. 2, the platform 55 has a general shape that extends substantially parallel to the plane P. The platform 55 comprises two frames 80, 82, two bridges 84, 86 extending transversely between the frames 80, 82, and a base 88 able to serve as a support for the effector 60.

The two frames 80, 82 are advantageously symmetrical relative to one another with respect to a plane of symmetry S1 substantially perpendicular to the transverse direction T when the platform 55 is in a symmetrical configuration shown in FIG. 2.

The frame 80 includes two heads 90, 92 opposite one another along the orientation direction DI and separated by a median part 94.

The head 90 defines two spheres 96, 98 that are for example substantially oriented at 45° relative to the orientation direction DI and the transverse direction T and pointing in opposite directions.

The spheres 96, 98 are suitable for cooperating with the articulated arm 35. The spheres 96, 98 respectively have spherical shapes complementary to the distal ends of the uprights 76, 78 of the articulated arm 35.

According to alternatives (not shown), the spheres have other orientations relative to the orientation direction DI and the transverse direction T, as long as these orientations are identical to those of the distal ends of the uprights 76, 78 of the articulated arm 35.

Likewise, the head 92 of the frame 80 defines two spheres 100, 102 pointing in opposite directions and for example forming an angle of substantially 45° with the orientation direction DI and the transverse direction T.

The spheres 100, 102 are suitable for cooperating with the articulated arm 50, in the same manner as the spheres 96, 98 are suitable for cooperating with the articulated arm 35.

Likewise, the frame 82 comprises two heads 104, 106 that are separated in the orientation direction DI by a median part 109.

The heads 104, 106 respectively define spheres 108, 110, 112, 114.

The spheres 108, 110 are suitable for cooperating with the articulated arm 40.

The spheres 112, 114 are suitable for cooperating with the articulated arm 45.

In the configuration shown in FIG. 2, the bridges 84, 86 are symmetrical relative to one another with respect to a plane of symmetry S2 substantially perpendicular to the orientation direction DI.

The bridge 84 is respectively articulated on the frames 80, 82 by two hinges 116, 118.

The bridge 86 is respectively articulated on the frames 80, 82 by two hinges 120, 122.

The hinges 116, 118, 120, 122 have hinge axes that are substantially parallel to the axial direction D and defining, projected on the plane P, a parallelogram ABCD.

The hinges 116, 118, 120, 122 are advantageously made by local thinning of the platform 55. The frames 80, 82 and the bridges 84, 86 are then integral.

In the configuration of FIG. 2, the sides AD and BC of the parallelogram ABCD are substantially parallel to the orientation direction DI and have a same length L1 along this same direction.

Still in the configuration of FIG. 2, the sides AB and CD of the parallelogram ABCD are oriented substantially transversely and have a same length L2 along the transverse direction T.

Advantageously, the ratio L1/L2 is greater than or equal to 2.0.

The base 88 for example has a generally annular shape, advantageously symmetrical relative to the planes of symmetry S1 and S2. The base 88 is respectively mounted on the bridges 84, 86 by two hinges 124, 126 defining two hinge axes substantially parallel to the axial direction V and defining two points E, F projected on the plane P.

Advantageously, the base 88 is only articulated on the bridges 84, 86 and is not directly mechanically connected to the frames 80, 82.

The hinges 124, 126, are advantageously similar in structure to the hinges 116, 118, 120, 122.

The points E and F are situated on the sides AB and CD of the parallelogram ABCD. The distance EB is substantially equal to the distance CF. The segment EF is substantially parallel to the sides AD and BC. Advantageously, the points E and F are respectively situated substantially at the middle of segments AB and CD.

The effector 60 is an element known in itself by those skilled in the art. The effector 60 is fastened on the base 88 so as to be secured in rotation with the base 88 around the median axis M. The segment EF defines the orientation of the entire base 88.

Figure 3:
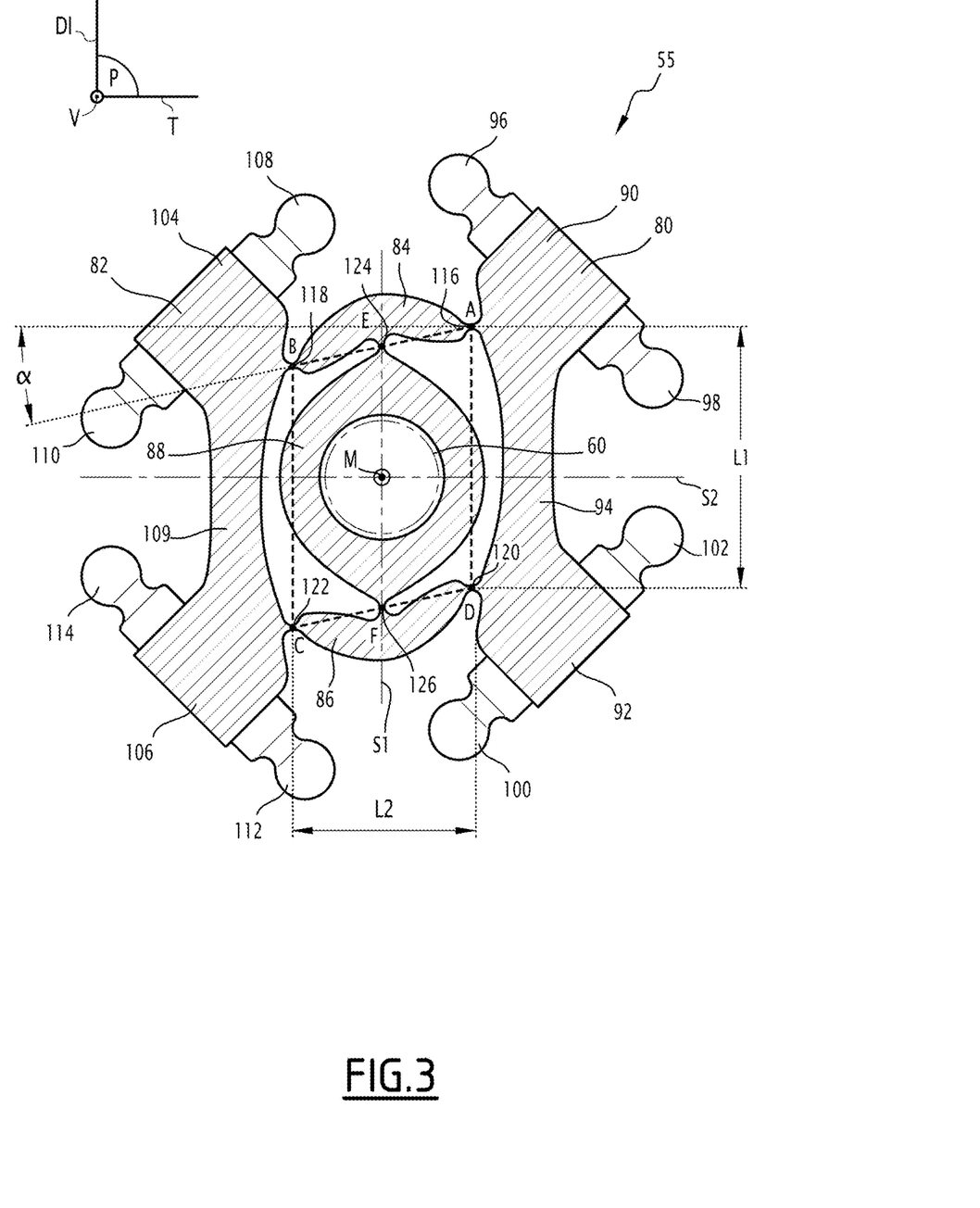
FIGS. 3 and 4 are respectively views similar to that of FIG. 2, the platform respectively being in two symmetrical configurations with respect to one another, in which the parallelogram is respectively deformed in one direction or the other relative to its rectangular shape shown in FIG. 2.
Figure 4:
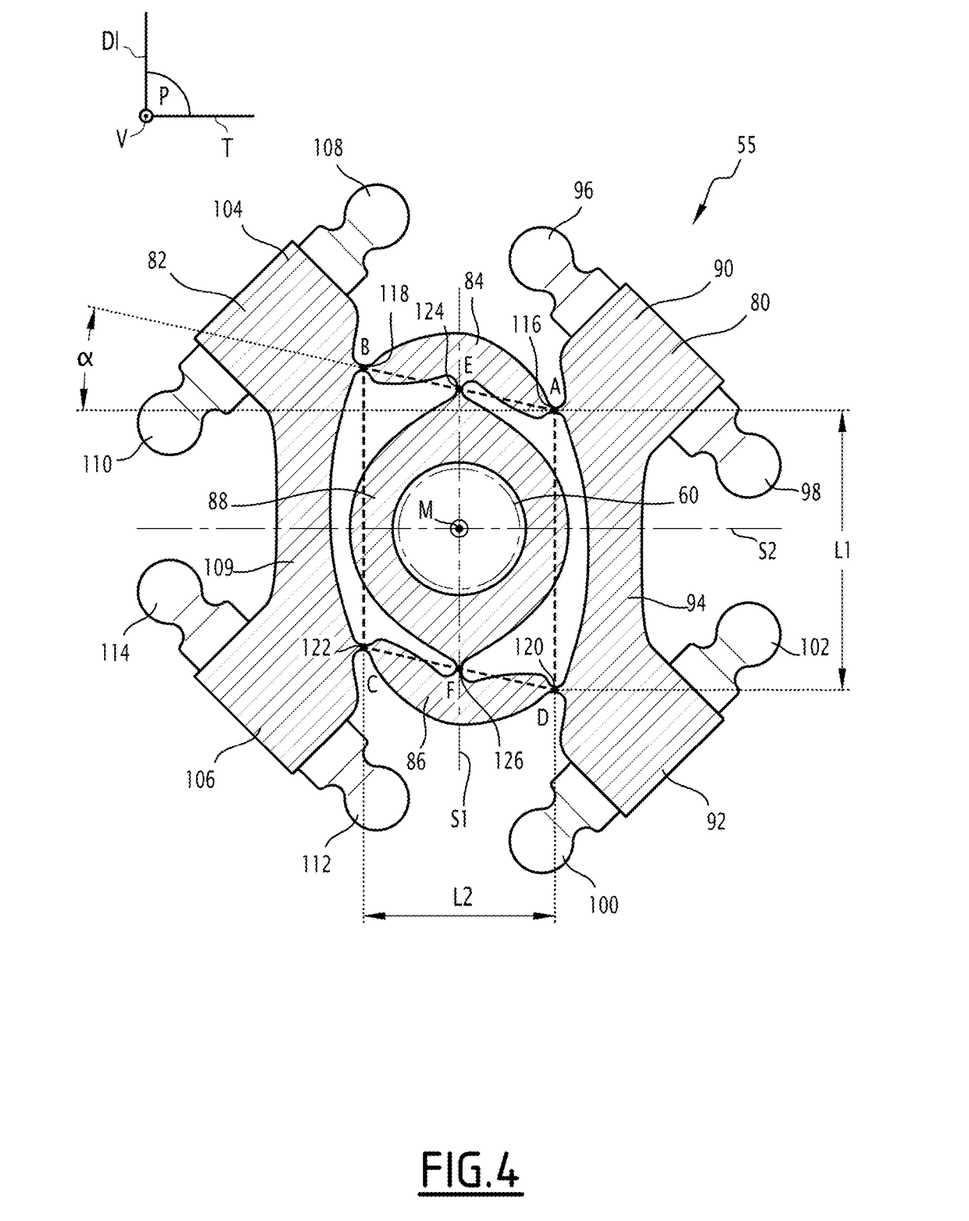

The platform 55 is movable between the configuration shown in FIG. 2 and a plurality of configurations, two of which are shown in FIGS. 3 and 4.

The configuration of the platform 55 shown in FIG. 3 is such that the parallelogram ABCD is no longer a rectangle. The angle ABC is then an obtuse angle. Such a configuration results from the configuration shown in FIG. 2 by translating the frames 80, 82 relative to one another along the orientation direction DI.

In FIG. 4, the platform 55 is in a configuration in which the parallelogram ABCD is such that the angle ABC is acute. Such a configuration is obtained from the configuration shown in FIG. 2 by translating the frames 80, 82 relative to one another along the orientation direction DI, in a sense opposite that which yields the configuration shown in FIG. 3.

The configurations of the parallelogram ABCD are for example defined by an angle α formed by the segment AB with the transverse direction T.

In the configuration of FIG. 2, the angle α is substantially zero. In the configuration of FIG. 3, the angle α is for example equal to +5 degrees.

In the configuration of FIG. 4, the angle α is for example equal to −5 degrees.

The angle α is for example comprised in a range from −5 degrees to +5 degrees.

The operation of the robot 1 will now be described.

As shown in FIG. 1, the actuators 15, 20, 25, 30 respectively make it possible to rotate the proximal parts 68 of the articulated arms 35, 40, 45, 50 effectively around axes D1, D2, D3, D4 relative to the support 10. This results in moving the spheres 72, 74 along circular trajectories in planes substantially parallel to the axial direction V.

Furthermore, owing to the sphere connections 72, 74 of the proximal parts 68 and owing to the spheres 96, 98, 100, 102, 108, 110, 112, 114 of the platform 55, the uprights 76, 78 of each distal part 70 of each articulated arm 35, 40, 45, 50 remain parallel to one another. Thus, the platform 55 retains its spatial orientation relative to the support 10. In the illustrated example, the platform 55 remains substantially parallel to the plane P and does not rotate relative to the support 10 around the axial direction V.

The four articulated arms 35, 40, 45, 50 constitute four kinematic chains to which three degrees of translational freedom of the platform 55 correspond, and an additional degree of freedom corresponding to the deformations of the parallelogram ABCD defined by the platform 55. In other words, the four angular positions of the proximal parts 68 of the articulated arms 35, 40, 45, 50 correspond to a single spatial position of the platform 55 relative to the support 10, and a configuration of the parallelogram ABCD formed by the platform, i.e., a value of the angle α.

The articulated arms 35, 40, 45, 50 deform the platform 55 such that the segments BC and AD remain substantially parallel to the orientation direction DI.

Since the distance BE is equal to the distance CF, the segment EF itself is parallel to the segments AD and BC.

Thus, the orientation of the base 88 around the axial direction V does not change, irrespective of the configuration of the parallelogram ABCD, since the orientation of the base is determined by the orientation of the segment EF.

Consequently, the orientation of the effector 60 around the axial direction V also does not change during translational movements of the platform 55 caused by the articulated arms 35, 40, 45, 50. It is thus possible to perform translational movements, called "pick-and-place", without rotating the object 5.

Furthermore, the force torques potentially exerted on the effector 60 around the axial direction V, for example due to an out of balance effect, are not transmitted to the articulated arms 35, 40, 45, 50, and are therefore not transmitted to the actuators 15, 20, 25, 30.

Thus, owing to the features described above, in particular the structure of the platform 55, the robot 1 is suitable for constraining the rotation of the object 5 around the axial direction V without this stressing the actuators and without this requiring excessive computing power. This makes it possible to achieve high dynamic performance levels and also increases the lifetime of the robot 1.

Furthermore, the platform 55 makes it possible to use a standard controller with independent axes typical of robots with four articulated arms. This makes it possible to increase the gains of the feedback loops, and therefore to improve the performance of the robot 1.

Furthermore, compared to a triangular platform robot like the "Delta" robot with only three kinematic chains, the fourth kinematic chain shown by the fourth articulated arm makes it possible to homogenize the performance of the robot 1, i.e., the performance does not deteriorate as quickly on the edges of the workspace of the robot 1.

The use of the degree of internal mobility of the platform 55 formed by the plurality of configurations of the parallelogram ABCD in the plane P in no way affects the transmission of the mechanical forces from the actuators 15, 20, 25, 30 to the effector 60. This degree of internal mobility of the platform 55 allows movements, advantageously infinitesimal, to offset any errors of the controller control models and the travel of the motors of the actuators 15, 20, 25, 30. This internal mobility also releases the internal actuating constraints of the robot 1.

The lifetime of the robot 1 is increased as a result, in particular that of costly elements of the actuators 15, 20, 25, 30 such as the motors, the reduction gears and the power amplifiers.

Owing to its four articulated arms 15, 20, 25, 30 evenly distributed in space, the robot 1 has more homogenous performance levels than those of a robot with three articulated arms for a same workspace, i.e., the movement zone of the object 5.

When the ratio L1/L2 is greater than or equal to 2.0, the hinges of the platform 55 are advantageously less mechanically stressed.

An outside couple of forces optionally exerted on the effector 60 around the axial direction V does not stress the motors of the articulated arms 35, 40, 45, 50, unlike what occurs in a robot with four traditional articulated arms.

Unlike a robot with four articulated arms and a rigid platform, the four articulated arms 35, 40, 45, 50 are controlled independently and their position is enslaved. The robot 1 has a kinematic redundancy, instead of an actuating redundancy. It is thus possible to use a traditional industrial control system, the minimum sampling period of which is only 1200 ms.

The robot 1 furthermore has a higher performance than a rigid platform robot of the "Delta" type in terms of acceleration capacity and its resistance to outside forces.

The robot 1 is hyperstatic to degree 1, which is an advantage in terms of rigidity, owing to a better distribution of the forces in the uprights 76, 78 of the articulated arms 35, 40, 45, 50.

Advantageously, the hinges 116, 118, 120, 122, 124, 126 are made by material thinning. The platform 25 can be made by molding. It is of course possible to use more traditional articulations between the different elements of the platform 55.

The orientation of the effector 60 around the axial direction V also does not change during translational movements of the platform 55 caused by the articulated arms 35, 40, 45, 50" of course means that the orientation of the effector is not affected by the translational movements of the platform done by the articulated arms, or by the more or less crushed shape that the parallelogram ABCD may assume during these translational movements.

Owing to this property of non-correlation between the orientation of the effector 60 around the axial direction V and the shape of the parallelogram ABCD formed by the platform 55, the couples of force potentially exerted on the effector 60 around the axial direction are not transmitted to the articulated arms 35, 40, 45, 50 or to the actuators 15, 20, 25, 30.

The orientation of the effector 60 around the axial direction V is the same as that of the base 88 and is for example given by the segment EF.

According to one particular embodiment, the effector 60 for example includes a part 61 fastened on the base 88 of the platform 55, and a part 63 for gripping the object 5 (FIG. 1).

The part 61 is fixed in terms of orientation around the axial direction V relative to the base 88 during the movement of the platform 55 and/or during the deformations of the parallelogram ABCD.

The gripping part 63 is for example a simple clamp. Alternatively (not shown), the gripping part 63 is a more complex tool, known in itself by those skilled in the art.

The part 63 is for example rotatable around the axial direction V relative to the part 61, and is advantageously actuated by a motor (not shown), as already mentioned above.

However, the axial rotation of the part 63 with respect to the part 61 is in no case the result of the deformation of the parallelogram ABCD. In other words, the platform 55 is configured so that it is not a deformation of the parallelogram ABCD that causes an axial rotation of the part 63. The axial rotation of the part 63 relative to the part 61 is the result of a specific actuation and is not related to the shape of the parallelogram ABCD.

The invention claimed is:

1. A parallel robot for acting on an object, the robot comprising:
    a support;
    four actuators fastened on the support;
    four articulated arms respectively mounted on the actuators;
    a platform; and
    an effector suitable for acting on the object,
    wherein the platform comprises:
        two frames, each of the two frames including at least two pairs of swivels;
        two bridges that are connected to each of the two frames respectively by four hinges oriented along four hinge axes that are substantially parallel to an axial direction, the four hinge axes defining a parallelogram in a plane perpendicular to the axial direction, the parallelogram being movable between a plurality of configurations in which two sides of the parallelogram corresponding to the two frames are substantially parallel to an orientation direction that is substantially perpendicular to the axial direction; and
        a base connected to the effector, the base being connected to each of the two bridges respectively by two hinges oriented along two connection axes substantially parallel to the axial direction, the two connection axes of the base defining, in said plane, a segment parallel to the orientation direction in all configurations of the parallelogram, and
        wherein each of the four articulated arms is respectively mounted on one of the at least two pairs of swivels of the platform, and
        the base is mounted on the platform such that an orientation of the effector around the axial direction does not change during translational movements of the platform caused by the four articulated arms.

2. The robot according to claim 1, wherein each segment of the parallelogram corresponding to one of the two frames has a length L1 and each segment of the parallelogram corresponding to one of the two bridges has a length L2, the ratio L1/L2 being greater than or equal to 2.0.

3. The robot according to claim 1, wherein the two frames and the two bridges of the platform are integral, and the hinges of the platform are made by local thinning of the platform.

4. The robot according to claim 1, wherein the four articulated arms are suitable for imparting a translational movement to the platform relative to the support, and for deforming the parallelogram between configurations of said plurality of configurations, the orientation direction remaining fixed relative to the support during the translational movement and in all configurations of said plurality of configurations.

5. The robot according to claim 1, wherein the axial direction is substantially vertical.

6. The robot according to claim 1, wherein each of the four articulated arms comprises:
    a proximal part mounted rotatably on the support; and
    a distal part connected to the proximal part by two swivels, and connected to the platform by one of the at least two pairs of swivels of the platform.

7. A method for operating a parallel robot including a support, four actuators fastened on the support, four articulated arms respectively mounted on the actuators, a platform, and an effector suitable for acting on the object, wherein the platform comprises at bast two frames, each of the two frames including at least two pairs of swivels, two bridges that are connected to each of the two frames respectively by four hinges oriented along four hinge axes that are substantially parallel to an axial direction, the four hinge axes defining a parallelogram in a plane perpendicular to the axial direction, the parallelogram being movable between a plurality of configurations in which two sides of the parallelogram corresponding to the two frames are substantially parallel to an orientation direction that is substantially perpendicular to the axial direction, and a base connected to the effector, the base being connected to each of the two bridges respectively two hinges oriented along two connection axes substantially parallel to the axial direction, the two connection axes of the base defining, in said plane, a segment parallel to the orientation direction in all configurations of the parallelogram, and wherein each of the four articulated arms is respectively mounted on one of the at least two pairs of swivels of the platform, and the base is mounted on the platform such that an orientation of the effector around the axial direction does not change during translational movements of the platform caused by the four articulated arms, the method comprising:
    acting on the object using the effector.

8. The method according to claim 7, further comprising:
    imparting a translational movement to the platform relative to the support using the four articulated arms, the orientation direction remaining fixed relative to the support; and
    deforming the parallelogram using the four articulated arms from any of the configurations of said plurality of configurations to any other of the configurations of said plurality of configurations, the orientation direction remaining fixed relative to the support.

9. The robot according to claim 1, wherein the four articulated arms are mounted rotatably on the support.

10. A parallel robot for acting on an object, the robot comprising:
    a support;
    four actuators fastened on the support;
    four articulated arms respectively mounted on the actuators;
    a platform; and an effector suitable for acting on the object,
wherein the platform comprises:
two frames, each of the two frames including at least two pairs of swivels;
two bridges that are connected to each of the two frames respectively by four hinges oriented along four hinge axes that are substantially parallel to an axial direction, the four hinge axes defining a parallelogram in a plane perpendicular to the axial direction, the parallelogram being movable between a plurality of configurations in which two sides of the parallelogram corresponding to the two frames are substantially parallel to an orientation direction that is substantially perpendicular to the axial direction; and
a base connected to the effector, the base being connected to each of the two bridges respectively by two hinges oriented along two connection axes substantially parallel to the axial direction, the two connection axes of the base defining, in said plane, a segment parallel to the orientation direction in all configurations of the parallelogram, and
wherein each of the four articulated arms is respectively mounted on one of the at least two pairs of swivels of the platform,
the base is mounted on the platform such that an orientation of the effector around the axial direction does not change during translational movements of the platform caused by the four articulated arms, and
the two connection axes of the base are respectively situated at the middle of sides of the parallelogram corresponding to the two bridges.

11. The robot according to claim 1, wherein each of the two frames includes two heads opposite one another along the orientation direction and separated by a median part.

* * * * *